United States Patent
Ko et al.

(10) Patent No.: US 8,364,091 B2
(45) Date of Patent: Jan. 29, 2013

(54) METHOD AND APPARATUS FOR SELECTING ANTENNA IN A COMMUNICATION SYSTEM

(75) Inventors: Eun-Seok Ko, Suwon-si (KR);
Yung-Soo Kim, Seongnam-si (KR);
Myeon-Kyun Cho, Seongnam-si (KR);
Dae-Sik Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1021 days.

(21) Appl. No.: 12/098,099

(22) Filed: Apr. 4, 2008

(65) Prior Publication Data
US 2008/0247330 A1    Oct. 9, 2008

(30) Foreign Application Priority Data

Apr. 5, 2007    (KR) .................. 10-2007-0033918

(51) Int. Cl.
*H04B 1/00* (2006.01)

(52) U.S. Cl. ............. 455/69; 455/39; 370/252; 375/267

(58) Field of Classification Search .................. 455/39, 455/69; 370/252; 375/267
See application file for complete search history.

(56) References Cited

U.S. PATENT DOCUMENTS

| | | |
|---|---|---|
| 6,687,492 B1 | 2/2004 | Sugar et al. |
| 2005/0152387 A1* | 7/2005 | Utsunomiya et al. ......... 370/431 |
| 2006/0245470 A1* | 11/2006 | Balachandran et al. ...... 375/133 |
| 2007/0041464 A1 | 2/2007 | Kim et al. |
| 2007/0098106 A1* | 5/2007 | Khojastepour et al. ....... 375/267 |

* cited by examiner

*Primary Examiner* — Lana N Le
*Assistant Examiner* — Hsin-Chun Liao
(74) *Attorney, Agent, or Firm* — Jefferson IP Law, LLP

(57) ABSTRACT

A method and apparatus for selecting an antenna in a communication system is provided. The apparatus includes a mobile station for determining a set of transmit antennas by considering statistical channel information, for determining a subset of the transmit antennas, which can increase a diversity gain and reduce an effect of a spatial correlation, from among the determined set of the transmit antennas by considering the statistical channel information and instantaneous channel information, for generating antenna selection information by using the determined subset of the transmit antennas, and for feeding back the generated antenna selection information to a base station.

28 Claims, 6 Drawing Sheets

METHOD AND APPARATUS FOR SELECTING ANTENNA IN A COMMUNICATION SYSTEM

PRIORITY

This application claims the benefit under 35 U.S.C. §119(e) of a Korean patent application filed in the Korean Industrial Property Office on Apr. 5, 2007 and assigned Serial No. 2007-0033918, the entire disclosure of which is hereby incorporated by reference.

BACKGROUND OF THE INVENTION

1. Field of the Invention

The present invention relates to a method and apparatus for selecting an antenna in a communication system. More particularly, the present invention relates to a method and apparatus for selecting a transmit antenna in an orthogonal frequency division multiple access (OFDMA) communication system employing a beamforming-multiple input multiple output (MIMO) scheme (hereinafter referred to as "beamforming-MIMO/OFDMA communication system").

2. Description of the Related Art

Next-generation communication systems are evolving with an emphasis on being able to transmit/receiving high-capacity data to/from a plurality of mobile stations (MS) at high speed. In order to achieve high-speed and high-capacity data transmission, it is important for next-generation communication systems to increase a data transfer rate and improve transmission reliability. Most next-generation communication systems use a MIMO scheme as a scheme for increasing a data transfer rate and improving transmission reliability. The MIMO scheme is a scheme in which a base station (BS) and a mobile station (MS) are provided with a plurality of antennas respectively, and transmit/receive data through their antennas. The MIMO scheme overcomes bandwidth resource limitations in a frequency domain by making the most of a space domain.

In a communication system using the MIMO scheme, each channel generated by each antenna has a spatial correlation with each of other channels, and the communication system suffers from a significant decrease in data transfer rate and a lowering of transmission reliability due to the spatial correlation between the respective channels. A two-dimensional transmit beamforming scheme using a spatial correlation matrix has been proposed to overcome such a problem.

The two-dimensional transmit beamforming scheme is a transmit beamforming scheme combined with a space-time block code (STBC), which uses an eigen-vector and an eigen-value of a spatial correlation matrix. Thus, a communication system using the two-dimensional transmit beamforming scheme can produce a space diversity effect through the STBC, and can reduce loss according to a spatial correlation between channels through the transmit beamforming scheme.

However, in a communication system using the two-dimensional transmit beamforming scheme, there is a problem in that a BS cannot obtain a sufficient diversity gain achievable by multiple transmit/receive antennas because it receives only statistical channel information and uses the received statistical channel information so as to reduce the effect of a spatial correlation between communication channels. For example, if a BS uses 4 antennas and the two-dimensional transmit beamforming scheme, and an MS uses one antenna, then only a second-order transmit diversity gain can be obtained despite there being a maximum of a fourth-order transmit diversity gain.

As a scheme for improving communication system performance by maximizing a transmit diversity gain, a communication has been proposed, in which the STBC is combined with a transmit antenna selection scheme. In a communication system using the STBC, an increase in transmit diversity gain generally results in a decrease in data transfer rate. To compensate for this, a communication system has been created, which can increase a transmit diversity gain without a decrease in data transfer rate by using the STBC and the transmit antenna selection scheme.

Hereinafter, the transmit antenna selection scheme will be described in more detail. In the transmit antenna selection scheme, an MS calculates a signal-to-noise ratio (SNR) corresponding to a received signal of each receive antenna, estimated in the MS, and selects at least two transmit antennas with the largest SRN to thereby generate antenna selection information. Also, the MS feeds back the antennas selection information to a BS. Subsequently, the BS selects a corresponding transmit antenna from among transmit antennas by using the antennas selection information, and transmits a space-time block coded signal to the MS through the selected transmit antenna.

However, since a communication system using the transmit antenna selection scheme allows for a transmit diversity gain, but does not take into account a spatial correlation between channels, there is a problem in that the performance of the communication system is lowered when there is a large spatial correlation between channels.

SUMMARY OF THE INVENTION

An aspect of the present invention is to address at least the above-mentioned problems and/or disadvantages and to provide at least the advantages described below. Accordingly, an aspect of the present invention is to provide a method and apparatus for selecting an antenna in a communication system.

Further, another aspect of the present invention is to provide a method and apparatus for selecting an antenna in a communication system, which takes account of both a spatial correlation and a transmit diversity gain.

In accordance with an aspect of the present invention, a method of selecting an antenna by a base station in a communication system is provided. The method includes receiving antenna selection information from a mobile station, selecting at least one transmit antenna from among all transmit antennas by considering the received antenna selection information, performing beamforming of a space-time block coded signal by means of a spatial correlation matrix of the selected transmit antenna, and transmitting the space-time block coded signal through the selected transmit antenna.

In accordance with another aspect of the present invention, a method of selecting an antenna by a mobile station in a communication system is provided. The method includes determining a set of transmit antennas by considering statistical channel information, determining a subset of the transmit antennas, which can increase a diversity gain and reduce an effect of a spatial correlation, from among the determined set of the transmit antennas by considering the statistical channel information and instantaneous channel information, generating antenna selection information by using the determined subset of the transmit antennas, and feeding back the generated antenna selection information to a base station.

In accordance with yet another aspect of the present invention, an apparatus for selecting an antenna in a communication system is provided. The apparatus includes a base station for receiving antenna selection information from a mobile station, for selecting at least one transmit antenna from among all transmit antennas by considering the received antenna selection information, for performing beamforming of a space-time block coded signal by means of a spatial correlation matrix of the selected transmit antenna, and for transmitting the space-time block coded signal through the selected transmit antenna.

In accordance with still yet another aspect of the present invention, an apparatus for selecting an antenna in a communication system is provided. The apparatus includes a mobile station for determining a set of transmit antennas by considering statistical channel information, for determining a subset of the transmit antennas, which can increase a diversity gain and reduce an effect of a spatial correlation, from among the determined set of the transmit antennas by considering the statistical channel information and instantaneous channel information, for generating antenna selection information by using the determined subset of the transmit antennas, and for feeding back the generated antenna selection information to a base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention include a method and apparatus for selecting an antenna in a communication system. For the convenience of explanation, the following description will be made in conjunction with an OFDMA communication system. However, present invention may be applied to communication systems other than the OFDMA communication system.

Figure 1:
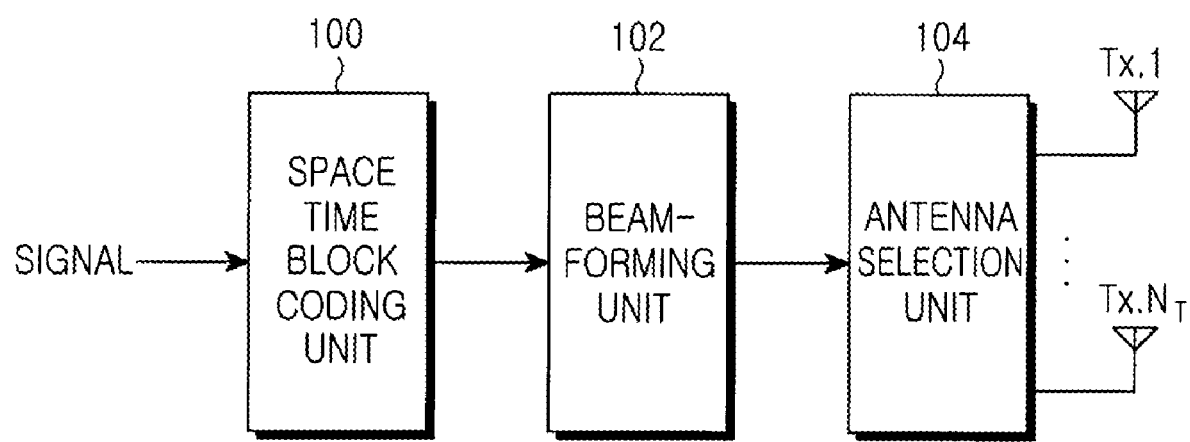
FIG. 1 is a block diagram illustrating a structure of a signal transmitter of a base station in a communication system in accordance with an exemplary embodiment of the present invention.

FIG. 1 illustrates the structure of a signal transmitter of a base station (BS) in a communication system according to an exemplary embodiment of the present invention. With reference to FIG. 1, a description will be given of the structure of a transmitter used by a BS for selecting at least one transmit antenna from among all of a plurality of transmit antennas, selecting a beamforming scheme, and transmitting a signal by using the selected transmit antenna according to the selected beamforming scheme.

Referring to FIG. 1, the signal transmitter of the BS includes a space-time block coding unit 100, a beamforming unit 102, and an antenna selection unit 104.

The space-time block coding unit 100 performs space-time block coding of an input signal by using a predefined space-time block code. For example, when a space-time block code is an Alamouti code, an input signal can be space-time block coded by using the Alamouti code. The beamforming unit 102 derives a spatial correlation matrix of channels for at least one selected transmit antenna from a spatial correlation matrix of all transmission channels for all transmit antennas by using antenna selection information, performs eigen-analysis of the derived spatial correlation matrix, performs eigen-beamforming for the selected transmit antenna, and then transmits the space-time block coded signal.

The antenna selection information is generated in an MS, and is fed back to the BS by the MS. The antenna selection information is information indicating a transmit antenna that is optimal for the MS.

The antenna selection unit 104 analyzes antenna selection information fed back from an MS to thereby select $N_K$ transmit antennas from among $N_T$ transmit antennas provided in the BS. Here, $N_T$ denotes the total number of transmit antennas, and $N_K$ denotes the number of transmit antennas selected from among all the transmit antennas.

A signal transmitter according to an exemplary embodiment of the present invention, which is used by a BS for selecting an antenna and transmitting a signal to an MS through the selected antenna, has been described so far. Reference will now be made to a procedure in which an MS generates and feeds back antenna selection information, and a procedure in which a BS receives the antenna selection information fed back from the MS, selects an antenna, and transmits a signal to the MS through the selected antenna in a communication system according to the present invention, with reference to FIGS. 2 and 3.

Figure 2:
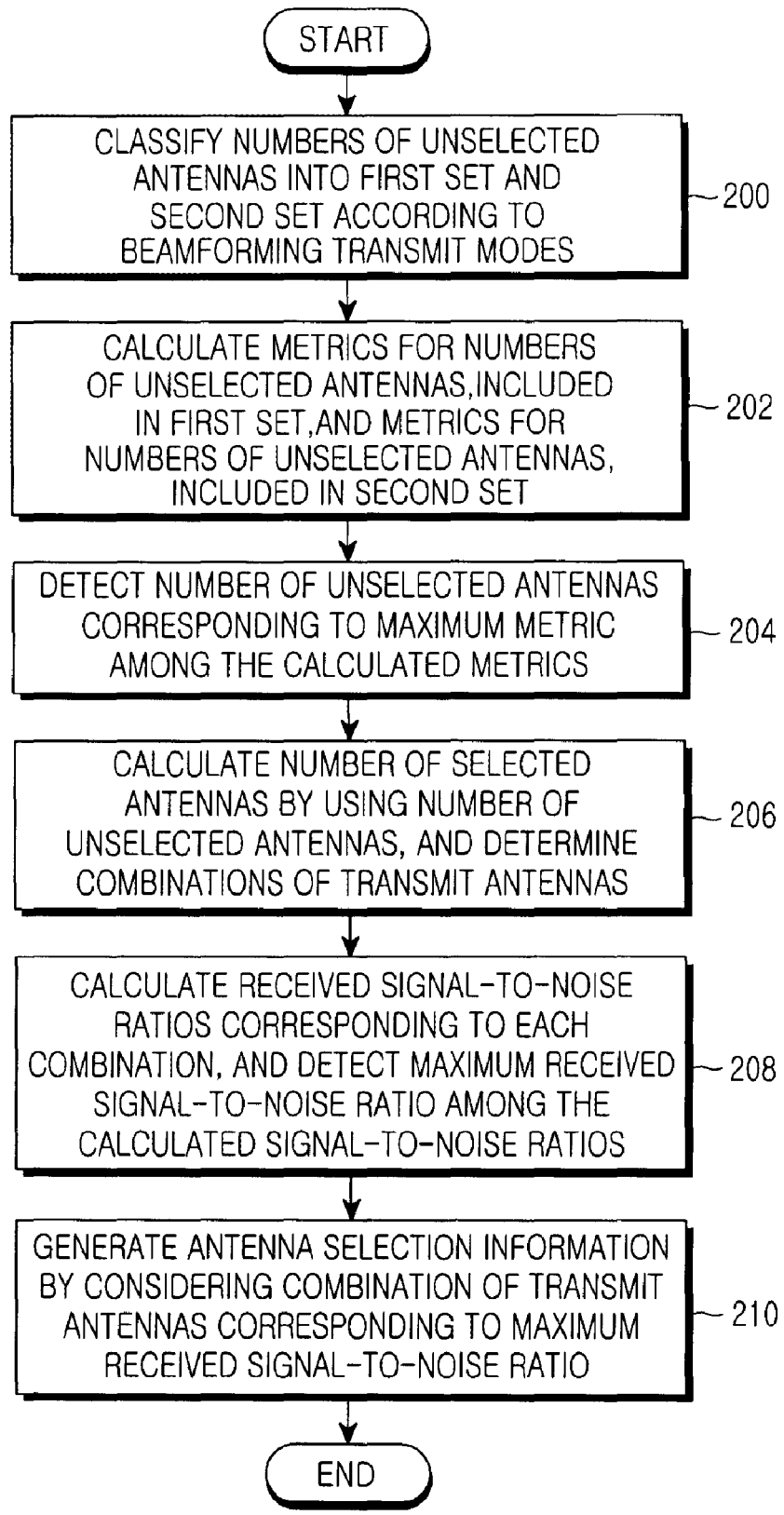
FIG. 2 is a flowchart illustrating a procedure in which a mobile station determines antenna selection information in a communication system in accordance with an exemplary embodiment of the present invention.

FIG. 2 illustrates a procedure in which an MS determines antenna selection information in a communication system according to an exemplary embodiment of the present invention.

In the following exemplary embodiment of the present invention, it is assumed that a BS is provided with a plurality of transmit antennas, and the MS is provided with one receive antenna.

Referring to FIG. 2, in step 200, the MS determines a beamforming transmit mode that is suitable for each of possible numbers of selected antennas, determines a first set of the numbers of unselected antennas or a second set of the numbers of unselected antennas according to the determined beamforming transmit mode, and then proceeds to step 202.

More specially, the MS can determine all of the numbers of selected antennas which are possible, based on the total number of antennas. For example, when the total number of antennas is $N_T$, the possible numbers of selected antennas may be 1, 2, ..., $N_T$.

In contrast to this, the number of unselected antennas, which is designated by s, can be represented by $s=N_T-N_K$, where $N_T$ denotes the total number of transmit antennas, and $N_K$ denotes the number of transmit antennas selected from among all of the transmit antennas. For example, when $N_T$ is 4 and $N_K$ is 1, s=3.

Also, the MS calculates a signal-to-noise ratio (SNR) for each channel of the receive antenna, and can derive an average SNR by averaging the calculated SNRs according to the channels. Further, the MS calculates an SNR threshold value corresponding to each of the possible numbers of selected antennas. For example, if the possible numbers of selected antennas are 1, 2, ..., $N_T$, the MS calculates an SNR threshold value at the time when the possible number of selected antennas is 1, calculates an SNR threshold value at the time when the possible number of selected antennas is 2, and repeats the calculation of an SNR threshold value until the possible number of selected antennas is $N_T$.

Such an SNR threshold value is intended to determine a beamforming transmit mode corresponding to the possible numbers of selected antennas.

When the MS calculates an SNR threshold value according to each of the possible numbers of selected antennas, it may use the following equation:

$$\gamma_T = \frac{1}{g}\left[\frac{1}{\lambda_2(\tilde{R}_T)} - \frac{1}{\lambda_1(\tilde{R}_T)}\right] \quad (1)$$

In Equation (1), $\gamma_T$ denotes an SNR threshold value for determining a beamforming transmit mode according to the possible number of selected antennas, g denotes a parameter value determined according to a modulation scheme (e.g., g may be g=0.1 in the case of 16-QAM, and g may be g=0.5 in the case of 4-QAM), $\tilde{R}_T$ denotes a channel correlation matrix for transmit antennas that may be selected from among all of the transmit antennas, $\lambda_1(\tilde{R}_T)$ denotes a first eigen-value of $\tilde{R}_T$, and $\lambda_2(\tilde{R}_T)$ denotes a second eigen-value of $\tilde{R}_T$.

In addition, the MS compares an SNR threshold value corresponding to each of the possible numbers of selected antennas with the average SNR. If a result of the comparison shows that the average SNR exceeds an SNR threshold value corresponding to the specific possible number of selected antennas, the MS recognizes that the specific possible number of selected antennas is suitable for a one-dimensional beamforming transmit mode, and determines the corresponding number of unselected antennas by using the specific possible number of selected antennas. Also, the MS includes the determined number of unselected antennas in the first set of the numbers of unselected antennas.

In contrast, if the average SNR does not exceed an SNR threshold value corresponding to the specific possible number of selected antennas, the MS recognizes that the specific possible number of selected antennas is suitable for a two-dimensional beamforming transmit mode, and determines the corresponding number of unselected antennas by using the specific possible number of selected antennas. Also, the MS includes the determined number of unselected antennas in the second set of the numbers of unselected antennas.

That is, the MS determines a beamforming transmit mode for each of the possible numbers of selected antennas, generates the numbers of unselected antennas, which correspond to the respective possible numbers of selected antennas, according to the determined beamforming transmit modes, and classifies the numbers of unselected antennas into a first set of the numbers of unselected antennas and a second set of the numbers of unselected antennas, and then determines the first set of the numbers of unselected antennas and the second set of the numbers of unselected antennas.

As another example, the BS may also generate a first set of the numbers of unselected antennas and a second set of the numbers of unselected antennas by classifying the numbers of unselected antennas corresponding to the respective possible numbers of selected antennas according to beamforming schemes. More specially, if the BS receives information, which indicates that an average SNR is greater than an SNR threshold value corresponding to the specific possible number of selected antennas, from the MS, it is more efficient for the BS to perform one-dimensional beamforming at the time of beamforming to the MS. Thus, when the BS receives information, which indicates that an average SNR is greater than an SNR threshold value corresponding to the specific possible number of selected antennas, from the MS, it determines the corresponding number of unselected antennas by using the specific possible number of selected antennas, and includes the determined number of unselected antennas in a first set of the numbers of unselected antennas.

In contrast, if the BS receives information, which indicates that an average SNR is less than an SNR threshold value corresponding to the specific possible number of selected antennas, from the MS, it is more efficient for the BS to perform two-dimensional beamforming at the time of beamforming to the MS. Thus, when the BS receives information, which indicates that an average SNR is less than an SNR threshold value corresponding to the specific possible number of selected antennas, from the MS, it determines the corresponding number of unselected antennas by using the specific possible number of selected antennas, and includes the determined number of unselected antennas in a second set of the numbers of unselected antennas.

In step 202, the MS calculates a first metric that is a factor allowing an average bit error rate to be determined corresponding to each of the numbers of unselected antennas, included in the first set of the numbers of unselected antennas, calculates a second metric that is a factor allowing an average bit error rate to be determined corresponding to each of the numbers of unselected antennas, included in the second set of the numbers of unselected antennas, and then proceeds to step 204.

The numbers of unselected antennas, included in the first set of the numbers of unselected antennas, are determined using the possible numbers of selected antennas, which are suitable for the one-dimensional beamforming transmit mode, and the numbers of unselected antennas, included in the second set of the numbers of unselected antennas, are determined using the possible numbers of selected antennas, which are suitable for the two-dimensional beamforming transmit mode. Accordingly, first metrics for the respective numbers of unselected antennas, included in the first set of the numbers of unselected antennas, and second metrics for the respective numbers of unselected antennas, included in the second set of the numbers of unselected antennas, are calculated using different equations.

The first metrics corresponding to the respective numbers of unselected antennas, included in the first set of the numbers of unselected antennas, are calculated using the following equation:

$$M(s) = \prod_{m=1}^{r_1} \left[1 + \gamma_0 g_{QAM1} \frac{\beta_s}{N_s(s)} \lambda_m(R_{h'_{s1}}^s)\right], \text{ if } s \in s_{1d} \quad (2)$$

In Equation (2), M(s) denotes a metric of the average bit error rate for one-dimensional beamforming according to the number of unselected antennas, $\gamma_0$ is $E_s/\sigma_n^2$, $E_s$ denotes average transmission power, $\sigma_n^2$ denotes average noise power, $g_{QAM1}$ is 3/(M−1), M denotes a QAM modulation order, $\beta_s$ denotes an adjustment parameter for approximating communication system performance, which has a value of $1 \leq \beta_s \leq N_s(s)$, $N_s(s)$ is $$N_s(s) = \begin{bmatrix} N_T \\ s \end{bmatrix}$$

and denotes the number of cases of all channels, according to the number of unselected antennas (i.e., s), $R_{h'_{s1}}^s$ denotes a spatial correlation matrix of all channels, according to the number of unselected antennas (i.e., s), and $\lambda_m(R_{h'_{s1}}^s)$ denotes an $m^{th}$ eigen-value of $R_{h'_{s1}}^s$. Also, $R_{h'_{s1}}^s$ reflects statistical channel information.

The second metrics corresponding to the respective numbers of unselected antennas, included in the second set of the numbers of unselected antennas, are calculated using the following equation:

$$M(s) = \prod_{m=1}^{r_2} \left[1 + \gamma_0 g_{QAM1} \frac{\beta_s}{4N_s(s)} \lambda_m(R_{h'_{s2}}^s)\right], \text{ if } s \in s_{2d} \quad (3)$$

In Equation (3), M(s) denotes a metric of the average bit error rate for two-dimensional beamforming according to the number of unselected antennas, $\gamma_0$ is $E_s/\sigma_n^2$, $E_s$ denotes average transmission power, $\sigma_n^2$ denotes average noise power, $g_{QAM1}$ is 3/(M−1), M denotes a QAM modulation order, $\beta_s$ denotes an adjustment parameter for approximating communication system performance, which has a value of $1 \leq \beta_s \leq N_s(s)$, $N_s(s)$ is $$N_s(s) = \begin{bmatrix} N_T \\ s \end{bmatrix}$$

and denotes the number of cases of all channels, according to the number of unselected antennas (i.e., s), $R_{h'_{s2}}^s$ denotes a spatial correlation matrix of all channels, according to the number of unselected antennas (i.e., s), and $\lambda_m(R_{h'_{s2}}^s)$ denotes an $m^{th}$ eigen-value of $R_{h'_{s2}}^s$. Also, $R_{h'_{s2}}^s$ reflects statistical channel information.

The MS calculates the first metrics corresponding to the respective numbers of unselected antennas, included in the first set of the numbers of unselected antennas, by using Equation (2), calculates the second metrics corresponding to the respective numbers of unselected antennas, included in the second set of the numbers of unselected antennas, by using Equation (3), and then proceeds to step 204.

In step 204, the MS retrieves a maximum metric that has the largest value from among the first metrics for the first set of the numbers of unselected antennas and the second metrics for the second set of the numbers of unselected antennas.

Also, the MS detects the number of unselected antennas, s, corresponding to the retrieved maximum metric, and then proceeds to step 206.

Such a metric is a factor that determines an average bit error rate when the BS selects as many transmit antennas as the possible number of selected antennas, corresponding to the metric, and performs beamforming for the selected transmit antennas. There is a feature in that a corresponding bit error rate decreases with an increase in the metric. Thus, the maximum metric that has the largest value from among the first metrics for the first set of the numbers of unselected antennas and the second metrics for the second set of the numbers of unselected antennas is used for determining the number of selected antennas, which can minimize an average bit error rate.

In step 206, the MS determines the number of selected antennas, $N_K$, which is the number of transmit antennas selected from among all of the antennas, by using the number of unselected antennas (i.e., s), detected in step 204. Also, the MS determines all combinations of transmit antennas, which can be represented by means of the determined $N_K$ from among all of the antennas, and then proceeds to step 208.

For example, when all antennas are a, b and c, and $N_K$ is 2, combinations of transmit antennas, determined by the MS, may be {a, b}, {b, c} and {c, a}.

In steps 200 to 206, the MS has determined the number of selected antennas, which minimizes an average bit error rate, by considering a correlation between a transmit diversity gain and a beamforming gain. With regard to this, the MS determines the number of selected antennas, which minimizes an average bit error rate, by using only statistical channel information. That is, when the MS determines the number of selected antennas, it uses only correlation matrix information between antennas, which corresponds to statistical channel information.

In step 208, the MS estimates received signal-to-noise ratios corresponding to the respective combinations of transmit antennas, detects a received signal-to-noise ratio that has the largest value from among the estimated received signal-to-noise ratios, and then proceeds to step 210. For example, when combinations of transmit antennas are {a, b}, {b, c} and {c, a}, the MS estimates a received signal-to-noise ratio corresponding to {a, b}, estimates a received signal-to-noise ratio corresponding to {b, c}, and estimates a received-signal-to-noise ratio corresponding to {c, a}. Also, the MS detects a maximum received signal-to-noise ratio that has the largest value from among the estimated received signal-to-noise ratios.

When the MS calculates received signal-to-noise ratios corresponding to respective combinations of transmit antennas, it can use the following equation:

$$\gamma = \sum_{\mu=1}^{2} \tilde{p}_\mu^2 \cdot |\tilde{u}_\mu^H \tilde{h}|^2 \frac{E_s}{\sigma_n^2} \quad (4)$$

In Equation (4), $\tilde{h}$ denotes a reconstructed transmission channel vector corresponding to $N_K$ transmit antennas selected from among $N_T$ transmit antennas, $\tilde{u}_\mu$ denotes an eigen-vector of $\tilde{R}_T$, $\tilde{R}_T$ denotes a channel correlation vector for selected antennas, $\tilde{p}_\mu$ denotes a power allocation factor that is derived in consideration of an eigen-value of $\tilde{R}_T$, and H denotes a hermitian of a matrix. Here, h reflects instantaneous channel information, and $\tilde{u}_\mu$ and $\tilde{p}_\mu$ reflect statistical channel information.

Further, in step 210, the MS generates antenna selection information that indicates a combination of transmit antennas, corresponding to the detected maximum received signal-to-noise ratio, and then feeds back the antenna selection information to the BS.

In steps 208 and 210, the MS estimates received signal-to-noise ratios corresponding to the respective combinations of transmit antennas, detects a maximum received signal-to-noise ratio that has the largest value from among the estimated received signal-to noise ratios, and then generates antenna selection information that indicates a combination of transmit antennas, corresponding to the detected maximum received signal-to-noise ratio. With regard to this, the MS estimates received signal-to-noise ratios by considering instantaneous channel information and statistical channel information, and then selects a combination of transmit antennas, corresponding to a received signal-to-noise ratio with the largest value, generates antenna selection information indicating the selected combination of transmit antennas, and then transmits the antenna selection information to the BS.

Figure 3:
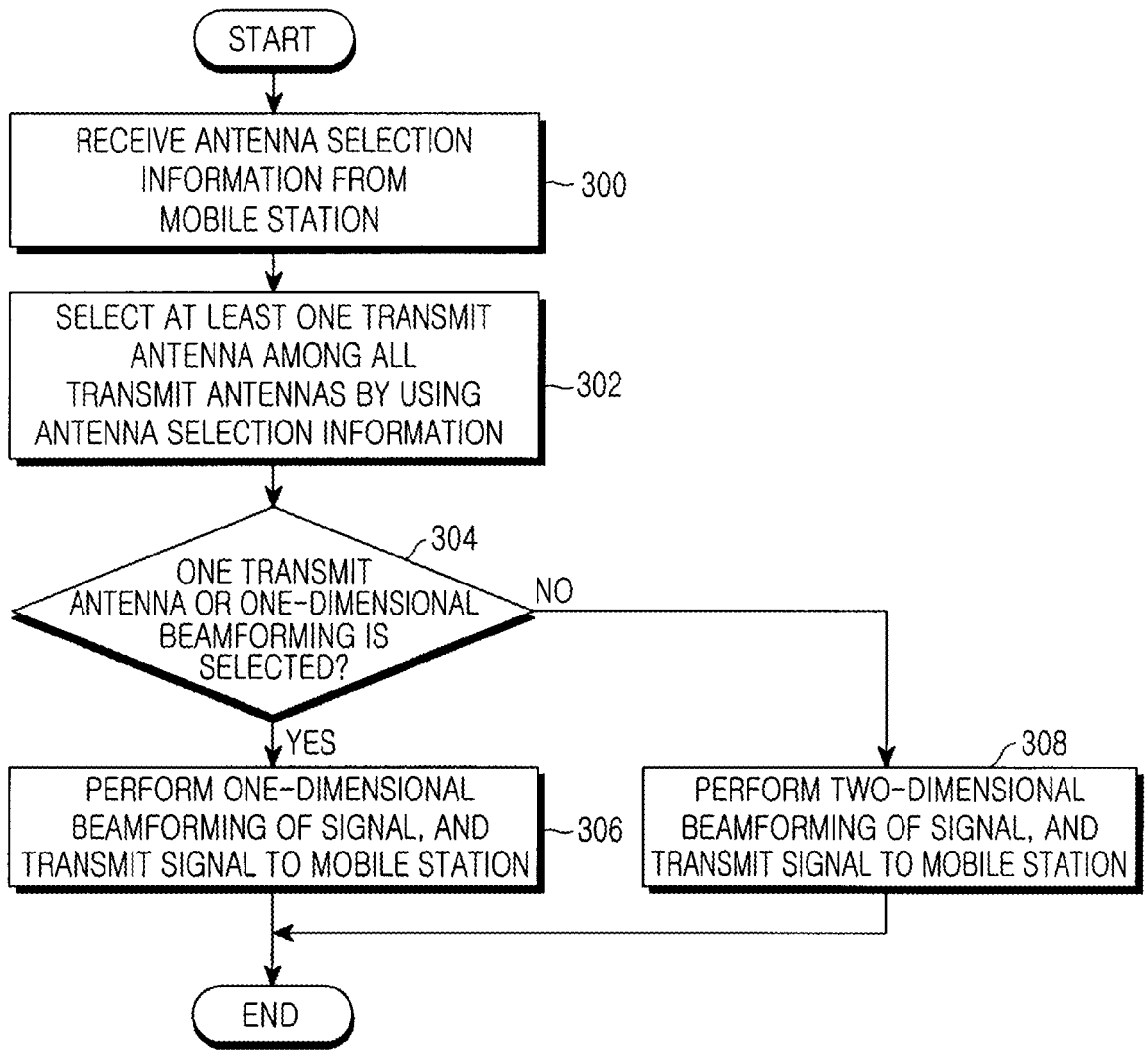
FIG. 3 is a flowchart illustrating a procedure in which a signal transmitter of a base station selects an antenna by using antenna selection information in a communication system in accordance with an exemplary embodiment of the present invention.

FIG. 3 illustrates a procedure in which a signal transmitter of a BS selects at least one antenna by using antenna selection information in a communication system according to an exemplary embodiment of the present invention.

In the following exemplary embodiment of the present invention, it is assumed that the number of antennas selected by the BS is the same as the number of receive antennas in an MS.

Referring to FIG. 3, in step 300, the BS receives antenna selection information that is obtained as described above and is fed back from an MS, and proceeds to step 302.

In step 302, the BS selects at least one transmit antenna from among all transmit antennas according to the antenna selection information, and then proceeds to step 304.

In step 304, the BS proceeds to step 306 when one transmit antenna is selected in step 302 or the number of transmit beams is one, and proceeds to step 308 when a plurality of transmit antennas are selected in step 302.

If the BS proceeds to step 306, then it performs one-dimensional beamforming for the one selected transmit antenna or the one transmit beam, and then transmits a signal.

If the BS proceeds to step 308, then it derives a spatial correlation matrix of channels for the plurality of selected transmit antennas, performs eigen-analysis of the derived spatial correlation matrix, performs two-dimensional beamforming for the selected transmit antennas, and then transmits a signal.

Figure 4:
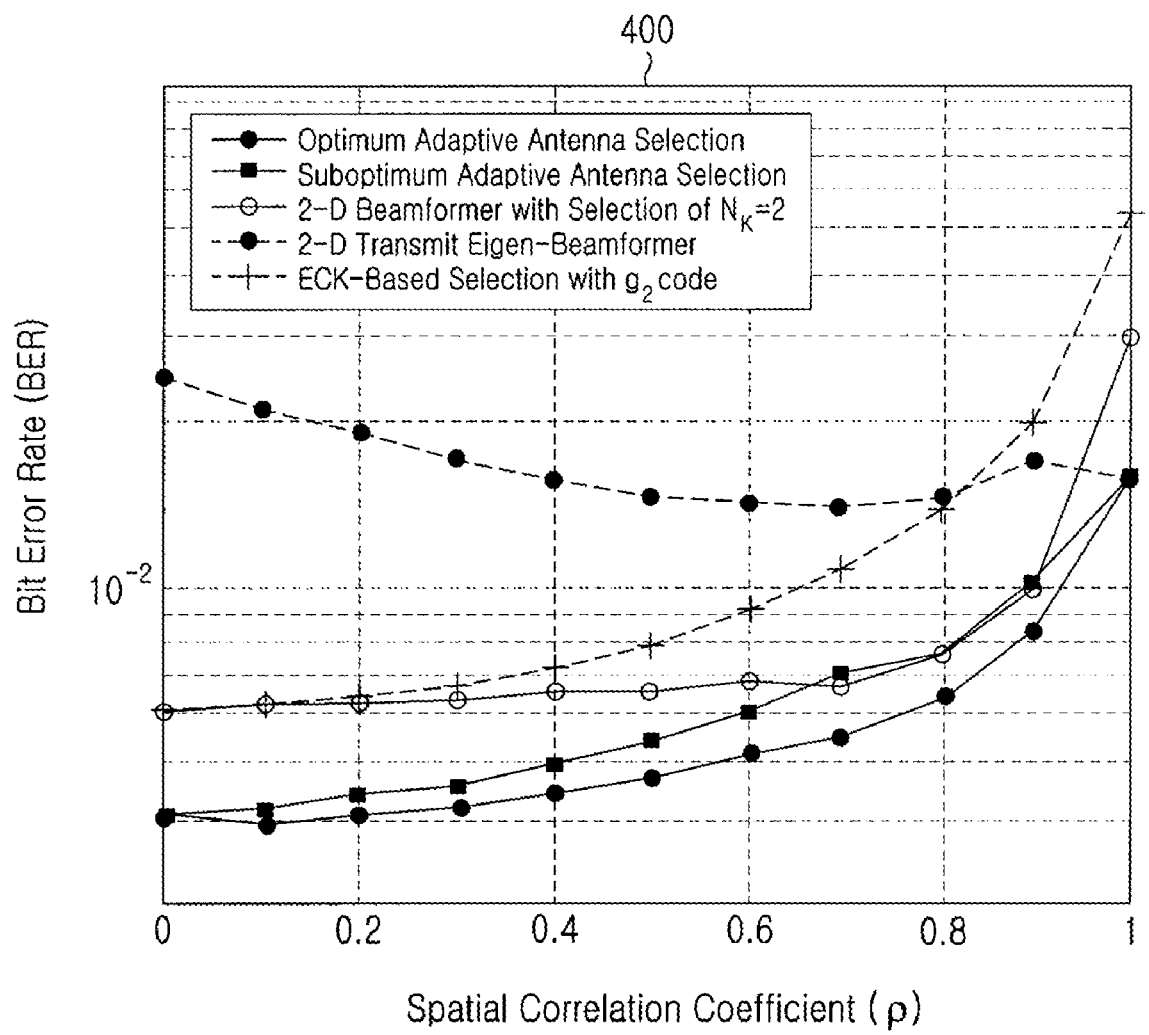
FIG. 4 is a graph illustrating a bit error rate that varies with the degree of a spatial correlation between channels in a communication system in accordance with an exemplary embodiment of the present invention.

FIG. 4 illustrates a bit error rate that varies with the degree of a spatial correlation between channels in a communication system according to an exemplary embodiment of the present invention.

Hereinafter, exemplary embodiments of the present invention will be referred to as a "suboptimum adaptive antenna selection scheme". An optimum adaptive antenna selection scheme refers to a scheme for calculating and selecting an antenna combination that maximizes a received signal-to-noise ratio for all combinations of transmit antennas. The inventive suboptimum adaptive antenna selection scheme is a scheme for determining an antenna combination in two steps. In a first step, the number of selected antennas, which can minimize an average bit error rate, is determined based on a spatial correlation matrix of channels. In a second step, an antenna combination is selected, which maximizes a received signal-to-noise ratio from among all antenna combinations for the determined number of selected antennas.

Referring to graph 400 of FIG. 4, the suboptimum adaptive antenna selection scheme is characterized in that it is more robust to a spatial correlation between channels than conventional schemes. More specially, when a spatial correlation is low, the suboptimum adaptive antenna selection scheme achieves a lower bit error rate than those in conventional schemes by making the most of a diversity gain. Even when a spatial correlation increase, a bit error rate becomes lower than those in conventional schemes if the inventive scheme for selecting the number of selected antennas is used.

Figure 5:
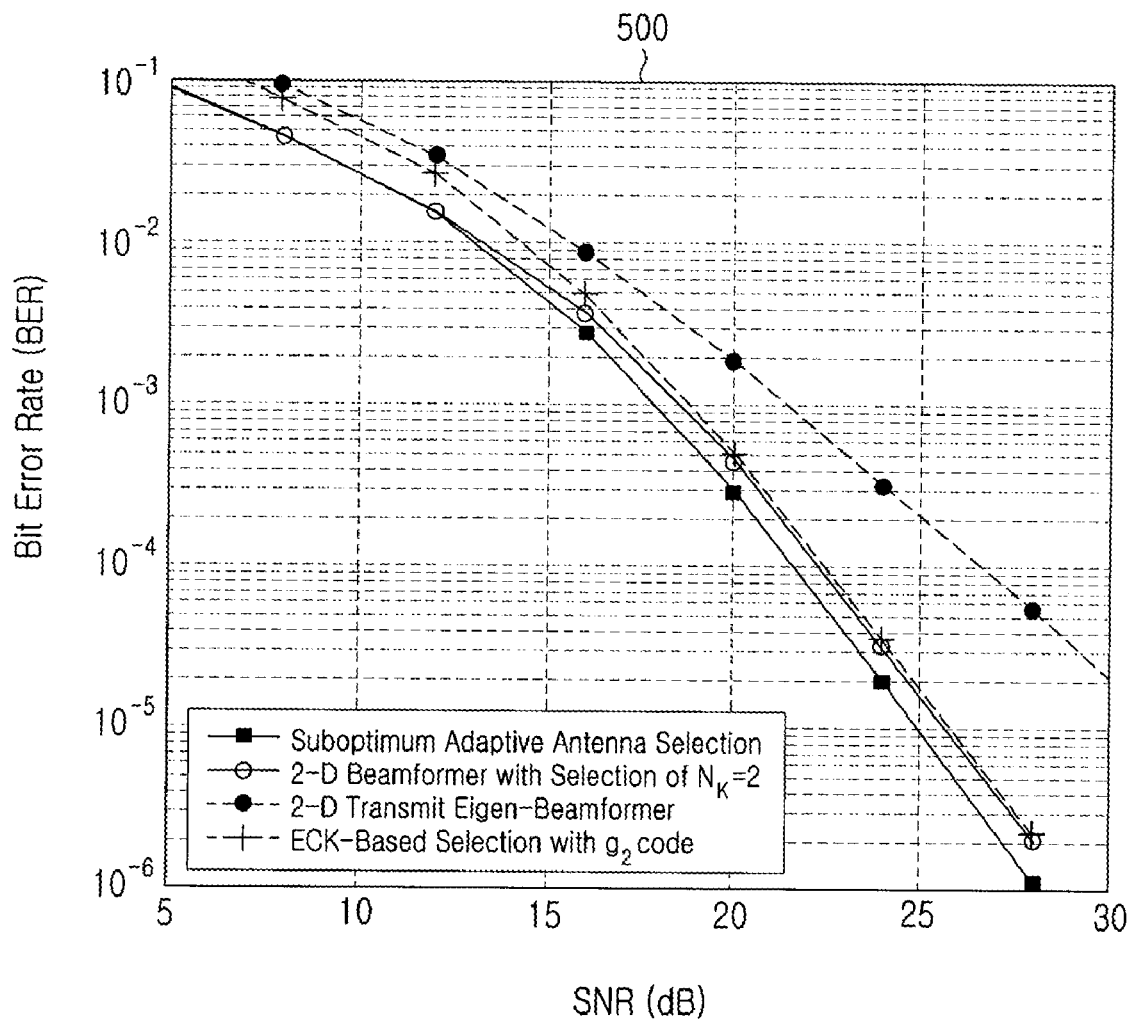
FIG. 5 is a graph illustrating a bit error rate that varies with a signal-to-noise ratio (SNR) in a communication system in accordance with an exemplary embodiment of the present invention.

FIG. 5 illustrates a bit error rate that varies with an SNR in a communication system according to an exemplary embodiment of the present invention.

FIG. 5 illustrates a variation in bit error rate as a function of an SNR for each of the suboptimum adaptive antenna selection scheme and conventional schemes.

In graph 500 of FIG. 5, it is assumed that a spatial correlation between channels is low. When comparing the suboptimum adaptive antenna selection scheme with the 2-D transmit eigen-beamformer scheme in a bit error rate range of $10^{-4}$, the suboptimum adaptive antenna selection scheme can obtain an SNR performance gain of 6 dB as compared to the 2-D transmit eigen-beamformer scheme. Also, when comparing the suboptimum adaptive antenna selection scheme with the 2-D beamformer scheme with selection of $N_K=2$, the suboptimum adaptive antenna selection scheme can obtain an SNR performance gain of 1.2 dB as compared to the 2-D beamformer scheme with selection of $N_K=2$.

Figure 6:
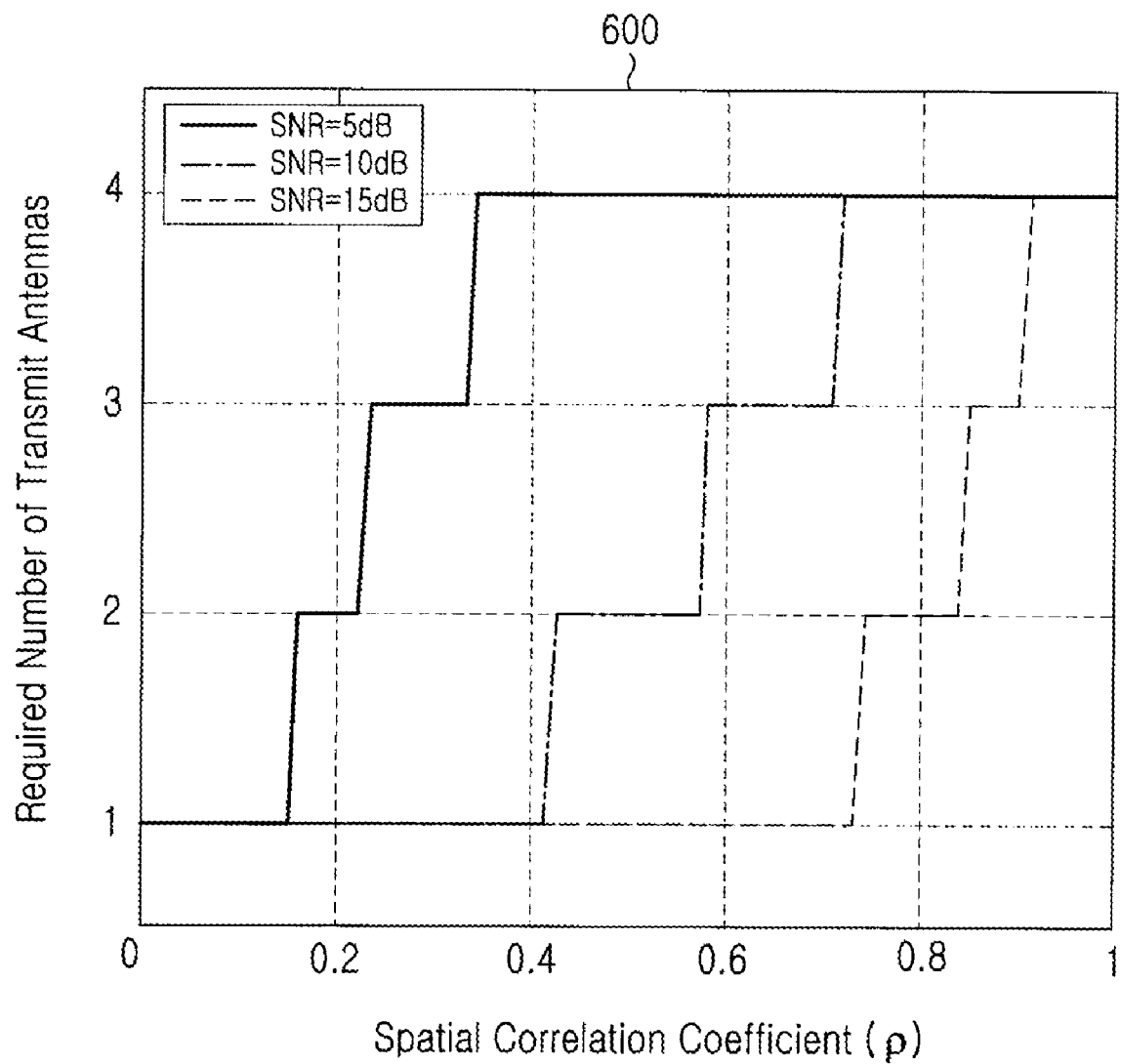
FIG. 6 is a graph illustrating the number of antennas, which varies with the degree of a spatial correlation between channels and a signal-to-noise ratio (SNR) in a communication system in accordance with an exemplary embodiment of the present invention.

FIG. 6 illustrates the number of antennas, which varies with the degree of a spatial correlation between channels and an SNR in a communication system according to an exemplary embodiment of the present invention.

In graph 600 of FIG. 6, the number of selected antennas is adaptively changed such that an average bit error rate can be minimized according to the degree of a spatial correlation between channels and an SNR. More specially, as the degree of a spatial correlation is higher, the number of selected antenna is increased so that a beamforming gain becomes large. In contrast, as the degree of a spatial correlation is lower, the number of selected antennas is decreased so that a spatial diversity gain becomes large. When different SNRs are considered at the same degree of a spatial correlation, the higher the SNR, the smaller the number of selected transmit antennas.

Through the above-mentioned procedure, the present invention makes it possible to select transmit antennas such that a transmit diversity gain can increase, and to perform beamforming such that the effect of a spatial correlation between channels can be reduced.

As described above, exemplary embodiments of the present invention provide a method and apparatus for selecting an antenna in a communication system, which can perform beamforming such that a transmit diversity gain increases and the effect of a spatial correlation between channels is reduced.

While the invention has been shown and described with reference to a certain exemplary embodiments thereof, it will be understood by those skilled in the art that various changes in form and details may be made therein without departing from the spirit and scope of the invention as defined by the appended claims and equivalents thereof. For example, in the above exemplary embodiments, an MS implements the present invention, but a BS may also implement the present invention if it receives information, which indicates a result of comparison between an average SNR and an SNR threshold value corresponding to each of the possible numbers of selected antennas, from an MS.

What is claimed is:

1. A method of selecting an antenna by a base station in a communication system, the method comprising:
receiving a result of comparison between an average signal-to-noise ratio for channels of a mobile station and signal-to-noise ratio threshold values corresponding to possible numbers of selected antennas from the mobile station;
determining beamforming schemes corresponding to the respective possible numbers of selected antennas by using the result of the comparison;
calculating metrics, which represent data error rates corresponding to the possible numbers of selected antennas, by considering the determined beamforming schemes;

determining a number from the possible numbers of selected antennas, corresponding to a maximum metric among the calculated metrics, as the determined number of selected antennas in the mobile station;

generating combinations of transmit antennas from among all transmit antennas in the base station, each combination having the determined number of selected antennas;

selecting a combination of transmit antennas, which has a maximum signal-to-noise ratio from among the combinations of transmit antennas; and generating antennas selection information comprising the selected combination of transmit antennas, wherein each of the signal-to-noise ratios is calculated by using instantaneous channel information and statistical channel information, and wherein each of the signal-to-noise ratios is calculated by using a reconstructed transmission channel vector corresponding to the selected antennas, an eigen-vector of a channel correlation vector for the selected antennas and a power allocation factor that is derived in consideration of the eigen-value.

2. The method as claimed in claim 1, wherein the determining of the determined number comprises classifying the possible numbers of selected antennas into a first set and a second set according to the beamforming schemes corresponding thereto.

3. The method as claimed in claim 2, wherein the classifying of the possible numbers of selected antennas into the first set and the second set comprises:

calculating the average signal-to-noise ratio for all of the channels;

calculating the signal-to-noise ratio threshold values corresponding to the respective possible numbers of selected antennas;

comparing the respective signal-to-noise ratio threshold values with the average signal-to-noise ratio;

when the signal-to-noise ratio threshold value corresponding to a specific possible number of selected antennas is equal to or less than the average signal-to-noise ratio, including the specific possible number of selected antennas in the first set; and when the signal-to-noise ratio threshold value corresponding to the specific possible number of selected antennas is greater than the average signal-to-noise ratio, including the specific possible number of selected antennas in the second set.

4. The method as claimed in claim 3, wherein each of the signal-to-noise ratio threshold values is calculated by the following equation, $$\gamma_T = \frac{1}{g} \left[ \frac{1}{\lambda_2(\tilde{R}_T)} - \frac{1}{\lambda_1(\tilde{R}_T)} \right]$$

where, $\gamma_T$ denotes the signal-to-noise ratio threshold value according to each of the possible numbers of selected antennas, g denotes a parameter value determined according to a modulation scheme, $\tilde{R}_T$ denotes a channel correlation matrix for the transmit antennas selected from among all of the transmit antennas, $\lambda_1(\tilde{R}_T)$ denotes a first eigen-value of $\tilde{R}_T$, and $\lambda_2(\tilde{R}_T)$ denotes a second eigen-value of $\tilde{R}_T$.

5. The method as claimed in claim 2, wherein each of the metrics corresponding to the respective possible numbers of selected antennas, included in the first set, is calculated by the following equation, $$M(s) = \prod_{m=1}^{r_1} \left[ 1 + \gamma_0 g_{QAM1} \frac{\beta_s}{N_s(s)} \lambda_m(R^s_{h'_{s1}}) \right], \text{ if } s \in s_{1d}$$

$$\gamma_0 = E_s / \sigma_n^2$$

$$g_{QAM1} = 3/(M-1)$$

where, M(s) denotes the metric for minimizing the average signal-to-noise ratio for one-dimensional beamforming, $E_s$ denotes average transmission power, $\sigma_n^2$ denotes average noise power, M denotes a QAM modulation order, $\beta_s$ denotes an adjustment parameter for approximating communication system performance, $N_s(s)$ denotes the number of the channels, according to the number of unselected antennas s, and $R_{h'_{s1}}^s$ denotes a spatial correlation matrix of all the channels, according to the number of unselected antennas s.

6. The method as claimed in claim 2, wherein each of the metrics corresponding to the respective possible numbers of selected antennas, included in the second set, is calculated by the following equation, $$M(s) = \prod_{m=1}^{r_2} \left[ 1 + \gamma_0 g_{QAM1} \frac{\beta_s}{4N_s(s)} \lambda_m(R^s_{h'_{s2}}) \right], \text{ if } s \in s_{2d}$$

$$\gamma_0 = E_s / \sigma_n^2$$

$$g_{QAM1} = 3/(M-1)$$

where, M(s) denotes the metric for minimizing the average signal-to-noise ratio for two-dimensional beamforming, $E_s$ denotes average transmission power, $\sigma_n^2$ denotes average noise power, M denotes a QAM modulation order, $\beta_s$ denotes an adjustment parameter for approximating communication system performance, $N_s(s)$ denotes the number of the channels, according to the number of unselected antennas s, and $R_{h'_{s2}}^s$ denotes a spatial correlation matrix of all the channels, according to the number of unselected antennas s.

7. The method as claimed in claim 1, wherein each of the signal-to-noise ratios is calculated by the following equation, $$\gamma = \sum_{\mu=1}^{2} \tilde{p}_\mu^2 \cdot |\tilde{u}_\mu^H \tilde{h}|^2 \frac{E_s}{\sigma_n^2}$$

where, $\tilde{h}$ denotes the reconstructed transmission channel vector corresponding to $N_K$ transmit antennas selected from among $\tilde{N}_T$ transmit antennas, $\tilde{u}_\mu$ denotes the eigen-vector of $\tilde{R}_T$, $\tilde{R}_T$ denotes the channel correlation vector for the selected antennas, $\tilde{p}_\mu$ denotes the power allocation factor that is derived in consideration of the eigen-value of $\tilde{R}_T$, and H denotes a hermitian of a matrix.

8. A method of selecting an antenna by a mobile station in a communication system, the method comprising:

determining beamforming schemes corresponding to possible numbers of selected antennas;

calculating metrics, which represent data error rates corresponding to the possible numbers of selected antennas, by considering the determined beamforming schemes;

determining a number from the possible numbers of selected antennas, corresponding to a maximum metric among the calculated metrics, as the determined number of selected antennas in the mobile station;

generating combinations of transmit antennas from among all transmit antennas in the base station, each combination having the determined number of selected antennas;

selecting a combination of transmit antennas, which has a maximum signal-to-noise ratio from among the combinations of transmit antennas; and transmitting antennas selection information comprising the selected combination of transmit antennas to the base station, wherein each of the signal-to-noise ratios is calculated by using instantaneous channel information and statistical channel information, and wherein each of the signal-to-noise ratios is calculated by using a reconstructed transmission channel vector corresponding to the selected antennas, an eigen-vector of a channel correlation vector for the selected antennas and a power allocation factor that is derived in consideration of the eigen-value.

9. The method as claimed in claim 8, wherein determining of the determined number comprises classifying the possible numbers of selected antennas into a first set and a second set according to the beamforming schemes corresponding thereto.

10. The method as claimed in claim 9, wherein the classifying of the possible numbers of selected antennas into the first set and the second set comprises:

calculating the average signal-to-noise ratio for all channels;

calculating the signal-to-noise ratio threshold values corresponding to the respective possible numbers of selected antennas;

comparing the respective signal-to-noise ratio threshold values with the average signal-to-noise ratio;

when the signal-to-noise ratio threshold value corresponding to a specific possible number of selected antennas is equal to or less than the average signal-to-noise ratio, including the specific possible number of selected antennas in the first set; and when the signal-to-noise ratio threshold value corresponding to the specific possible number of selected antennas is greater than the average signal-to-noise ratio, including the specific possible number of selected antennas in the second set.

11. The method as claimed in claim 10, wherein each of the signal-to-noise ratio threshold values is calculated by the following equation, $$\gamma_T = \frac{1}{g}\left[\frac{1}{\lambda_2(\tilde{R}_T)} - \frac{1}{\lambda_1(\tilde{R}_T)}\right]$$

where, $\gamma_T$ denotes the signal-to-noise ratio threshold value according to each of the possible numbers of selected antennas, g denotes a parameter value determined according to a modulation scheme, $\tilde{R}_T$ denotes a channel correlation matrix for the transmit antennas selected from among all of the transmit antennas, $\lambda_1(\tilde{R}_T)$ denotes a first eigen-value of $\tilde{R}_T$, and $\lambda_2(\tilde{R}_T)$ denotes a second eigen-value of $\tilde{R}_T$.

12. The method as claimed in claim 9, wherein each of the metrics corresponding to the respective possible numbers of selected antennas, included in the first set, is calculated by the following equation, $$M(s) = \prod_{m=1}^{r_1}\left[1 + \gamma_0 g_{QAM1}\frac{\beta_s}{N_s(s)}\lambda_m(R_{h'_{s1}}^s)\right], \text{ if } s \in s_{1d}$$

$$\gamma_0 = E_s/\sigma_n^2$$

$$g_{QAM1} = 3/(M-1)$$

where, M(s) denotes the metric for minimizing the average signal-to-noise ratio for one-dimensional beamforming, $E_s$ denotes average transmission power, $\sigma_n^2$ denotes average noise power, M denotes a QAM modulation order, $\beta_s$ denotes an adjustment parameter for approximating communication system performance, $N_s(s)$ denotes the number of the channels, according to the number of unselected antennas s, and $R_{h'_{s1}}^s$ denotes a spatial correlation matrix of all the channels, according to the number of unselected antennas s.

13. The method as claimed in claim 9, wherein each of the metrics corresponding to the respective possible numbers of selected antennas, included in the second set, is calculated by the following equation, $$M(s) = \prod_{m=1}^{r_2}\left[1 + \gamma_0 g_{QAM1}\frac{\beta_s}{4N_s(s)}\lambda_m(R_{h'_{s2}}^s)\right], \text{ if } s \in s_{2d}$$

$$\gamma_0 = E_s/\sigma_n^2$$

$$g_{QAM1} = 3/(M-1)$$

where, M(s) denotes the metric for minimizing the average signal-to-noise ratio for two-dimensional beamforming, $E_s$ denotes average transmission power, $\sigma_n^2$ denotes average noise power, M denotes a QAM modulation order, $\beta_s$ denotes an adjustment parameter for approximating communication system performance, $N_s(s)$ denotes the number of the channels, according to the number of unselected antennas s, and $R_{h'_{s2}}^s$ denotes a spatial correlation matrix of all the channels, according to the number of unselected antennas s.

14. The method as claimed in claim 8, wherein each of the signal-to-noise ratios is calculated by the following equation, $$\gamma = \sum_{\mu=1}^{2}\tilde{p}_\mu^2 \cdot |\tilde{u}_\mu^H \tilde{h}|^2 \frac{E_s}{\sigma_n^2}$$

where, $\tilde{h}$ denotes the reconstructed transmission channel vector corresponding to $N_K$ transmit antennas selected from among $\tilde{N}_T$ transmit antennas, $\tilde{u}_\mu$ denotes the eigen-vector of $\tilde{R}_T$, $\tilde{R}_T$ denotes the channel correlation vector for the selected antennas, $\tilde{p}_\mu$ denotes the power allocation factor that is derived in consideration of the eigen-value of $\tilde{R}_T$, and H denotes a hermitian of a matrix.

15. An apparatus for selecting an antenna by a base station in a communication system, the apparatus comprising:

the base station for receiving a result of comparison between an average signal-to-noise ratio for channels of a mobile station and signal-to-noise ratio threshold values corresponding to possible numbers of selected antennas from the mobile station, for determining beamforming schemes corresponding to the respective possible numbers of selected antennas by using the result of the comparison, for calculating metrics, which represent data error rates corresponding to the possible numbers of selected antennas, by considering the determined beamforming schemes, for determining a number from the possible numbers of selected antennas, corresponding to a maximum metric among the calculated metrics, as the determined number of selected antennas in the mobile station, for generating combinations of transmit antennas from among all transmit antennas in the base station, each combination having the determined number of selected antennas, for selecting a combination of transmit antennas, which has a maximum signal-to-noise ratio from among the combinations of transmit antennas, and for generating antennas selection information comprising the selected combination of transmit antennas, wherein each of the signal-to-noise ratios is calculated by using instantaneous channel information and statistical channel information, and wherein each of the signal-to-noise ratios is calculated by using a reconstructed transmission channel vector corresponding to the selected antennas, an eigen-vector of a channel correlation vector for the selected antennas and a power allocation factor that is derived in consideration of the eigen-value.

16. The apparatus as claimed in claim 15, wherein the base station classifies the possible numbers of selected antennas into a first set and a second set according to the beamforming schemes corresponding thereto.

17. The apparatus as claimed in claim 16, wherein the base station calculates the average signal-to-noise ratio for all of the channels, calculates the signal-to-noise ratio threshold values corresponding to the respective possible numbers of selected antennas, compares the respective signal-to-noise ratio threshold values with the average signal-to-noise ratio, includes a specific possible number of selected antennas, which has the signal-to-noise ratio threshold value equal to or less than the average signal-to-noise ratio, in the first set, and includes the specific possible number of selected antennas, which has the signal-to-noise ratio threshold value greater than the average signal-to-noise ratio, in the second set.

18. The apparatus as claimed in claim 17, wherein each of the signal-to-noise ratio threshold values is calculated by the following equation, $$\gamma_T = \frac{1}{g}\left[\frac{1}{\lambda_2(\tilde{R}_T)} - \frac{1}{\lambda_1(\tilde{R}_T)}\right]$$

where, $\gamma_T$ denotes the signal-to-noise ratio threshold value according to each of the possible numbers of selected antennas, g denotes a parameter value determined according to a modulation scheme, $\tilde{R}_T$ denotes a channel correlation matrix for the transmit antennas selected from among all of the transmit antennas, $\lambda_1(\tilde{R}_T)$ denotes a first eigen-value of $\tilde{R}_T$, and $\lambda_2(\tilde{R}_T)$ denotes a second eigen-value of $\tilde{R}_T$.

19. The apparatus as claimed in claim 16, wherein each of the metrics corresponding to the respective possible numbers of selected antennas, included in the first set, is calculated by the following equation, $$M(s) = \prod_{m=1}^{r_1}\left[1 + \gamma_0 g_{QAM1}\frac{\beta_s}{N_s(s)}\lambda_m(R^s_{h'_{s1}})\right], \text{ if } s \in s_{1d}$$

$$\gamma_0 = E_s/\sigma_n^2$$

$$g_{QAM1} = 3/(M-1)$$

where, M(s) denotes the metric for minimizing the average signal-to-noise ratio for one-dimensional beamforming, $E_s$ denotes average transmission power, $\sigma_n^2$ denotes average noise power, M denotes a QAM modulation order, $\beta_s$ denotes an adjustment parameter for approximating communication system performance, $N_s(s)$ denotes the number of the channels, according to the number of unselected antennas s, and $R_{h'_{s1}}^s$ denotes a spatial correlation matrix of all the channels, according to the number of unselected antennas s.

20. The apparatus as claimed in claim 16, wherein each of the metrics corresponding to the respective possible numbers of selected antennas, included in the second set, is calculated by the following equation, $$M(s) = \prod_{m=1}^{r_2}\left[1 + \gamma_0 g_{QAM1}\frac{\beta_s}{4N_s(s)}\lambda_m(R^s_{h'_{s2}})\right], \text{ if } s \in s_{2d}$$

$$\gamma_0 = E_s/\sigma_n^2$$

$$g_{QAM1} = 3/(M-1)$$

where, M(s) denotes the metric for minimizing the average signal-to-noise ratio for two-dimensional beamforming, $E_s$ denotes average transmission power, $\sigma_n^2$ denotes average noise power, M denotes a QAM modulation order, $\beta_s$ denotes an adjustment parameter for approximating communication system performance, $N_s(s)$ denotes the number of the channels, according to the number of unselected antennas s, and $R_{h'_{s2}}^s$ denotes a spatial correlation matrix of all the channels, according to the number of unselected antennas s.

21. The apparatus as claimed in claim 15, wherein each of the signal-to-noise ratios is calculated by the following equation, $$\gamma = \sum_{\mu=1}^{2}\tilde{p}_\mu^2 \cdot |\tilde{u}_\mu^H \tilde{h}|^2 \frac{E_s}{\sigma_n^2}$$

where, $\tilde{h}$ denotes the reconstructed transmission channel vector corresponding to $N_K$ transmit antennas selected from among $N_T$ transmit antennas, $\tilde{u}_\mu$ denotes the eigen-vector of $\tilde{R}_T$, $\tilde{R}_T$ denotes the channel correlation vector for the selected antennas, $\tilde{p}_\mu$ denotes the power allocation factor that is derived in consideration of the eigen-value of $\tilde{R}_T$, and H denotes a hermitian of a matrix.

22. An apparatus for selecting an antenna by a mobile station in a communication system, the apparatus comprising:

the mobile station for determining beamforming schemes corresponding to possible numbers of selected antennas, for calculating metrics, which represent data error rates corresponding to the possible numbers of selected antennas, by considering the determined beamforming schemes, for determining a number from the possible numbers of selected antennas, corresponding to a maximum metric among the calculated metrics, as the determined number of selected antennas in the mobile station, for generating combinations of transmit antennas from among all transmit antennas in the base station, each combination having the determined number of selected antennas, for selecting a combination of transmit antennas, which has a maximum signal-to-noise ratio from among the combinations of transmit antennas, and for transmitting antennas selection information comprising the selected combination of transmit antennas to the base station, wherein each of the signal-to-noise ratios is calculated by using instantaneous channel information and statistical channel information, and wherein each of the signal-to-noise ratios is calculated by using a reconstructed transmission channel vector corresponding to the selected antennas, an eigen-vector of a channel correlation vector for the selected antennas and a power allocation factor that is derived in consideration of the eigen-value.

23. The apparatus as claimed in claim 22, wherein the mobile station classifies the possible numbers of selected antennas into a first set and a second set according to the beamforming schemes corresponding thereto.

24. The apparatus as claimed in claim 23, wherein the mobile station calculates the average signal-to-noise ratio for all channels, calculates the signal-to-noise ratio threshold values corresponding to the respective possible numbers of selected antennas, compares the respective signal-to-noise ratio threshold values with the average signal-to-noise ratio, includes a specific possible number of selected antennas, which has the signal-to-noise ratio threshold value equal to or less than the average signal-to-noise ratio, in the first set, and includes the specific possible number of selected antennas, which has the signal-to-noise ratio threshold value greater than the average signal-to-noise ratio, in the second set.

25. The apparatus as claimed in claim 24, wherein each of the signal-to-noise ratio threshold values is calculated by the following equation, $$\gamma_T = \frac{1}{g}\left[\frac{1}{\lambda_2(\tilde{R}_T)} - \frac{1}{\lambda_1(\tilde{R}_T)}\right]$$

where, $\gamma_T$ denotes the signal-to-noise ratio threshold value according to each of the possible numbers of selected antennas, g denotes a parameter value determined according to a modulation scheme, $\tilde{R}_T$ denotes a channel correlation matrix for the transmit antennas selected from among all of the transmit antennas, $\lambda_1(\tilde{R}_T)$ denotes a first eigen-value of $\tilde{R}_T$, and $\lambda_2(\tilde{R}_T)$ denotes a second eigen-value of $\tilde{R}_T$.

26. The apparatus as claimed in claim 23, wherein each of the metrics corresponding to the respective possible numbers of selected antennas, included in the first set, is calculated by the following equation, $$M(s) = \prod_{m=1}^{r_1}\left[1 + \gamma_0 g_{QAM1}\frac{\beta_s}{N_s(s)}\lambda_m(R^s_{h'_{s1}})\right], \text{ if } s \in s_{1d}$$

$$\gamma_0 = E_s/\sigma_n^2$$

$$g_{QAM1} = 3/(M-1)$$

where, M(s) denotes the metric for minimizing the average signal-to-noise ratio for one-dimensional beamforming, $E_s$ denotes average transmission power, $\sigma_n^2$ denotes average noise power, M denotes a QAM modulation order, $\beta_s$ denotes an adjustment parameter for approximating communication system performance, $N_s(s)$ denotes the number of the channels, according to the number of unselected antennas s, and $R_{h'_{s1}}^s$ denotes a spatial correlation matrix of all the channels, according to the number of unselected antennas s.

27. The apparatus as claimed in claim 23, wherein each of the metrics corresponding to the respective possible numbers of selected antennas, included in the second set, is calculated by the following equation, $$M(s) = \prod_{m=1}^{r_2}\left[1 + \gamma_0 g_{QAM1}\frac{\beta_s}{4N_s(s)}\lambda_m(R^s_{h'_{s2}})\right], \text{ if } s \in s_{2d}$$

$$\gamma_0 = E_s/\sigma_n^2$$

$$g_{QAM1} = 3/(M-1)$$

where, M(s) denotes the metric for minimizing the average signal-to-noise ratio for two-dimensional beamforming, $E_s$ denotes average transmission power, $\sigma_n^2$ denotes average noise power, M denotes a QAM modulation order, $\beta_s$ denotes an adjustment parameter for approximating communication system performance, $N_s(s)$ denotes the number of the channels, according to the number of unselected antennas s, and $R_{h'_{s2}}^s$ denotes a spatial correlation matrix of all the channels, according to the number of unselected antennas s.

28. The apparatus as claimed in claim 22, wherein each of the signal-to-noise ratios is calculated by the following equation, $$\gamma = \sum_{\mu=1}^{2}\tilde{p}_\mu^2 \cdot |\tilde{u}_\mu^H \tilde{h}|^2 \frac{E_s}{\sigma_n^2}$$

where, $\tilde{h}$ denotes the reconstructed transmission channel vector corresponding to $N_K$ transmit antennas selected from among $N_T$ transmit antennas, $\tilde{u}_\mu$ denotes the eigen-vector of $\tilde{R}_T$, $\tilde{R}_T$ denotes the channel correlation vector for the selected antennas, $\tilde{p}_\mu$ denotes the power allocation factor that is derived in consideration of the eigen-value of $\tilde{R}_T$, and H denotes a hermitian of a matrix.

* * * * *